(12) United States Patent
Yap et al.

(10) Patent No.: US 11,928,204 B2
(45) Date of Patent: Mar. 12, 2024

(54) METHOD AND SYSTEM WITH MULTIPLE HETEROGENEOUS TEE IMPLEMENTATIONS

(71) Applicant: Foris Technology Pte Ltd, Singapore (SG)

(72) Inventors: Kian Chuan Yap, Sai Wan (HK); Ming Sum Sam Ng, Sai Wan (HK); Jason Wai King Lau, Sai Wan (HK); Chun Ting Yip, Sai Wan (HK); Tung Ling Terry Young, Sai Wan (HK); Durgesh Pandey, Sai Wan (HK)

(73) Assignee: Foris Technology Pte Ltd, Singapore (SG)

( * ) Notice: Subject to any disclaimer, the term of this patent is extended or adjusted under 35 U.S.C. 154(b) by 268 days.

(21) Appl. No.: 17/548,776

(22) Filed: Dec. 13, 2021

(65) Prior Publication Data
US 2022/0188404 A1    Jun. 16, 2022

(30) Foreign Application Priority Data
Dec. 15, 2020  (HK) ............................ 32020022161.4

(51) Int. Cl.
*G06F 21/53*  (2013.01)

(52) U.S. Cl.
CPC ........ *G06F 21/53* (2013.01); *G06F 2221/033* (2013.01)

(58) Field of Classification Search
CPC .... G06F 21/53; G06F 2221/033; G06F 21/57; G06F 21/577; G06F 21/602
See application file for complete search history.

(56) References Cited

U.S. PATENT DOCUMENTS

| 2017/0317984 A1 | 11/2017 | Ollikainen et al. |
| 2019/0149333 A1* | 5/2019 | Harnik ............... H04L 9/3247 713/176 |

(Continued)

FOREIGN PATENT DOCUMENTS

| CN | 109948354 | 6/2019 |
| CN | 110597459 | 12/2019 |

(Continued)

OTHER PUBLICATIONS

Cheng, R. et al., "Ekiden: A Platform for Confidentiality-Preserving, Trustworthy, and Performant Smart Contract Execution", arxiv.org, Cornell University Ithaca NY, dated Apr. 14, 2018, pp. 1-20.

(Continued)

*Primary Examiner* — Beemnet W Dada
(74) *Attorney, Agent, or Firm* — Warner Norcross + Judd LLP

(57) ABSTRACT

A TEE system that includes a first platform that runs a first TEE, a second platform that runs a second TEE, and a merging unit that is adapted to merge a first output from the first TEE of the first platform, with a second output from the second TEE of the second platform, so as to form an output of the TEE system. The first TEE and the second TEE are based on different implementations. In this way, the security of the system is improved, as a malicious actor even be able to access "t" machines, still would not be able to retrieve the secret unless there are multiple exploitable TEE vulnerabilities on all executing TEE platforms at the same time.

7 Claims, 2 Drawing Sheets

(56) References Cited

U.S. PATENT DOCUMENTS

| | | | |
|---|---|---|---|
| 2020/0327230 A1 | 10/2020 | Bitauld | |
| 2020/0342092 A1 | 10/2020 | Wei et al. | |
| 2021/0160074 A1* | 5/2021 | Kumaresan | H04L 9/3218 |

FOREIGN PATENT DOCUMENTS

| | | |
|---|---|---|
| CN | 111064569 | 4/2020 |
| CN | 111555857 | 8/2020 |
| WO | 2016/200524 | 12/2016 |

OTHER PUBLICATIONS

Berard, D., "Kinibi Tee: Trusted Application Exploitation", blogpost available at https://synacktiv.com/en/publications/kinibi-tee-trusted-application-exploitation.html, dated Oct. 12, 2018, pp. 1-8.

Machiry, A. et al., "BOOMERANG: Exploiting the Semantic Gap in Trusted Execution Environments", Network and Distributed System Security Symposium (NDSS) Feb. 28-Mar. 1, 2017, pp. 1-15.

Cloosters, T. et al., "TeeRex: Discovery and Exploitation of Memory Corruption Vulnerabilities in SGX Enclaves", Proceedings of the 29th USENIX Security Symposium, Aug. 12-14, 2020, pp. 1-19.

Dou, Z. et al., "Systematization of Knowledge (SoK): A Systematic Review of Software-Based Web Phishing Detection," in IEEE Communications Surveys & Tutorials, vol. 19, No. 4, Sep. 13, 2017, Abstract.

Li, W. et al., "TEEv: virtualizing trusted execution environments on mobile platforms", VEE 2019: Proceedings of the 15th ACM SIGPLAN/SIGOPS International Conference on Virtual Execution Environments, Apr. 2019, Astract.

Kwon, D. et al., "PrOS: Light-Weight Privatized Secure OSes in ARM TrustZone", IEEE Transactions on Mobile Computing, vol. 19, No. 6, Apr. 15, 2019, Abstract.

Pedersen, T., "A Threshold Cryptosystem without a Trusted Party", Advances in Cryptology, Eurocrypt 1991, pp. 522-526.

Veugen, T. et al., "An implementation of the Paillier crypto system with threshold decryption without a trusted dealer", 2019 Cryptology ePrint Archive, pp. 1-15.

\* cited by examiner

METHOD AND SYSTEM WITH MULTIPLE HETEROGENEOUS TEE IMPLEMENTATIONS

FIELD OF INVENTION

This invention relates to data security of computing devices, and in particular to the use of trusted execution environment (TEE).

BACKGROUND OF INVENTION

A Trusted Execution Environment (TEE) is an isolated execution environment that provides security features such as isolated execution, integrity of applications executing with the TEE, along with confidentiality of their assets. Existing TEEs are usually implemented based on a combination of hardware component (in particular, Central Processing Unit (CPU)) and software component. As a high-level overview, security features of the TEE can be achieved by forbidding the debug function during the program execution, encrypting the memory pages used by the executing program, and providing a mechanism to remotely testify to another user/program that this process is indeed running in a TEE.

TEE is very useful, for example it can be used for Digital Rights Management (e.g. a decryption key of a music file), Private Key Management (e.g. a private key to sign a transaction), along with many other applications. A remote user can share some sensitive data with a TEE if it can testify it is running a particular software, which might be audited by the user and therefore he/she knows it will not leak out the sensitive data. The remote attestation includes the hash of the executable binary. And if the user audited the source code of the binary, then he knows whether he can trust the code, and he can then share the sensitive data with the TEE if he trusts it.

However, while the idea of TEE sounds very secure, like any other software applications or semi-software modules there are vulnerabilities that exist in various TEE implementations. For example, while some of the vulnerabilities may be cross platforms, at least some of them are platform-specific. By exploiting these vulnerabilities, an attacker still can gain sensitive information that they are not supposed to have access to.

SUMMARY OF INVENTION

In the light of the foregoing background, it is an objective of the present invention to provide a robust TEE system and a method to build a secure TEE even in the presence of known TEE vulnerabilities.

The above objective is met by the combination of features of the main claim; the sub-claims disclose further advantageous embodiments of the invention.

One skilled in the art will derive from the following description other objectives of the invention. Therefore, the foregoing statements of objectives are not exhaustive and serve merely to illustrate some of the many objectives of the present invention.

Accordingly, the invention, in one aspect, is a TEE system that includes a first platform that runs a first TEE, a second platform that runs a second TEE, and a merging unit that is adapted to merge a first output from the first TEE of the first platform, with a second output from the second TEE of the second platform, so as to form an output of the TEE system. The first TEE and the second TEE are based on different implementations.

In one embodiment, application codes running on the first platform and the second platform for the first TEE and the second TEE respectively are different.

In one embodiment, the application codes include cryptographic library or application logic.

In one embodiment, the first TEE or the second TEE is adapted to be testified remotely by a user.

In one embodiment, the merging unit is adapted to merge the first output and the second output using a cryptographic method.

In one embodiment, the first output or the second output is reshuffled when a vulnerability of respectively the first TEE and the second TEE is patched.

According to another aspect of the invention, a method of generating an output of a TEE system includes the steps of: providing a first output from a first TEE of a first platform in the TEE system; providing a second output from a second TEE of a second platform in the TEE system; and merging the first output and the second output to form the output of the TEE system.

In one embodiment, the method further comprises remotely testifying the first TEE before providing the first output, or remotely testifying the second TEE before providing the second output.

In one embodiment, the method further comprises the step of providing a third output from a third TEE of a third platform in the TEE system. The merging step contains merging the first output, the second output and the third output to form the output of the TEE system.

In one embodiment, the method further comprises the steps of: detecting a vulnerability of the first TEE; disconnecting the first TEE; and generating the output of the TEE system by merging the second output and the third output.

Embodiments of the invention thus mitigate TEE vulnerabilities that may reside in each single TEE implementation by implementing (almost) the same application logic but on heterogeneous TEE platforms, e.g. on Intel SGX and ARM TrustZone at the same time, and then use cryptographic methods to join the results together. Therefore, if a new vulnerability is found on Intel SGX, but that vulnerability is not applicable to the ARM, the overall system is still secure, and vice versa.

Even if the vulnerability is applicable to more than one platform, developing exploit codes on multiple platforms is going to make the exploitability much less likely to happen. Generally speaking, the chance of having a vulnerability that can be used to attack the system will be decreased by increasing the number of implementations on different TEE platforms. Similar to how each independent factor within Multi-Factor Authentication (MFA) has been breached, the cumulative nature of using all three factors makes a system significantly harder to breach, and thus, the integrity of the system is maintained.

Besides protecting from external hackers, a heterogeneous TEE environment according to embodiments of the invention makes TEE related patch management more secure too. Within a multiple heterogenous TEE implementation, if a TEE vulnerability is found on one of the TEE platforms, this platform can be simply disconnected, and the rest of the TEE platforms could still be used to construct an output of the TEE system. And after a patch is available and installed on the vulnerable TEE, the whole system can then reshuffle the keys to render the old key, even if it is hacked during the unpatched period, to become useless. The whole system will then be as secure as before the vulnerability is published.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "device" or "component" refers to any instruction execution apparatus such as a computer/processor based system, a computing device, or a hardware and/or software system that can fetch or obtain the logic from a non-transitory storage medium or a non-transitory computer-readable storage medium and execute the instructions contained therein. "Device" or "component" can also include any software-based instruction execution module, such as a sub-set of a software bundle, cloud-based utility, service or feature, or any other virtual function block that is not tied to a particular hardware.

Figure 1:
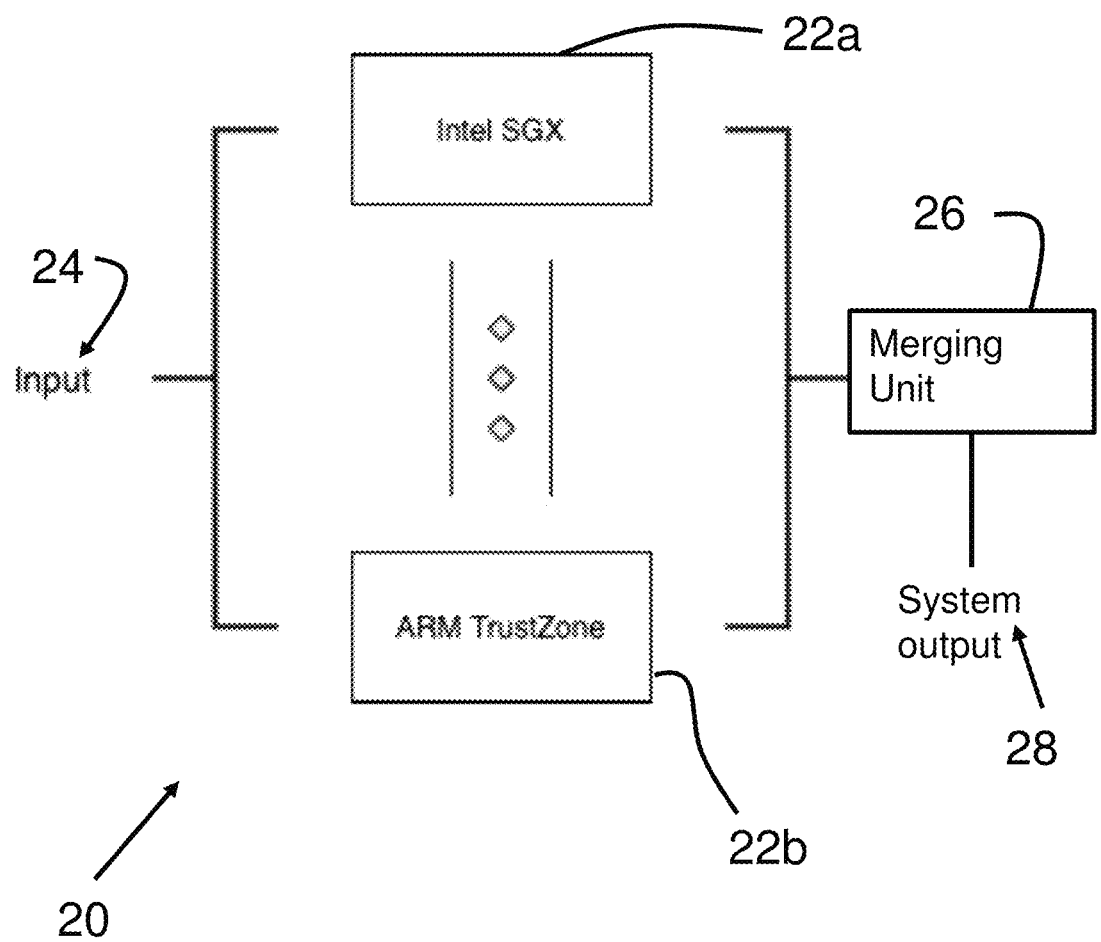
FIG. 1 is a high-level illustration of a system which contains a prevention device connected to blockchain networks, according to one embodiment of the invention.

Referring now to FIG. 1, the first embodiment of the invention is a TEE system 20 that contains multiple heterogeneous TEE platforms including a first platform 22a and a second platform 22b, which are connected both to an input 24. The first platform 22a in this embodiment is an Intel® processor supporting Intel® Software Guard Extensions (Intel® SGX). As known to those skilled in the art, the Intel SGX is an extension to the x86 architecture that allows running applications in a completely isolated secure enclave. As such the Intel SGX as a TEE implementation is adapted to run on the first platform 22a. On the other hand, the second platform 22b in this embodiment is an ARM® processor that supports ARM® TrustZone®. As known to those skilled in the art, the ARM TrustZone is a hardware-based security technology built into ARM CPUs and IP to provide a secure execution environment. As such the ARM TrustZone as a TEE implementation is adapted to run on the second platform 22b.

It should be noted that although not explicitly shown in FIG. 1, the TEE system 20 could contain other platforms with different and/or the same TEE implementations as the first platform 22a or the second platform 22b. Examples of available TEE implementations include AMD® Secure Execution Environment, IBM® Secure Execution, and RISC-V MultiZone. Nonetheless, as the system 20 contains at least two TEE implementations which are the Intel SGX and the ARM TrustZone, the system 20 provides a multiple heterogeneous TEE environment. A system including in comparison only a single type of TEE implementation, but on multiple platforms/machines, is known as a multiple homogenous TEE environment.

The system 20 further includes a merging unit 26 that is adapted to merge individual outputs of the first platform 22a and the second platform 22b (and any other similar output from additional TEE platforms in the system 20). The merging unit 26 uses cryptographic method(s) to merge the outputs from the first platform 22a and the outputs from the second platform 22b into one final output which is provided at the system output 28. The required multi-party computation by the merging unit 26 is not specified, but it could be any known algorithm that can securely perform the originally intended operation, but in a multi-party fashion. For example, if the application of the system 20 is a Key Management System and needs to perform a signature, then instead of performing a simple single-user signature, the system 20 perform a multi-party signature. Provided as some possible candidates, for signatures on Elliptic Curve, one can use MuSig for multi-party Schnorr signature. For ECDSA (Elliptic Curve Digital Signature Algorithm), one can use Threshold ECDSA by Doerner et al. For signatures on RSA, one can use Victor Shoup's algorithm. For Key Management System performing encryption/decryption, some possible candidates for multi-party encryption/decryption including Perdersen's threshold ElGamal scheme, or Paillier's threshold decryption by Veugen et al.

Now turning to the working principle of the TEE system 20 in FIG. 1. In the system 20, TEE vulnerabilities that may exist on each one of the Intel SGX on the first platform 22a and the ARM TrustZone on the second platform 22b may be mitigated by implementing almost the same application logic but on the above-mentioned heterogeneous TEE platforms 22a, 22b. A method of generating an output of the TEE system 20 is now described. Firstly, an instruction/data is provided to the input 24 of the system 20 to initiate the computation in the TEE system 20. The instruction/data is then sent to the first platform 22a and the second platform 22b in parallel so that computations are performed simultaneously in the Intel SGX that runs in the first platform 22a, and then in the ARM TrustZone that runs in the second platform 22b. Subsequently, individual outputs are generated by the first platform 22a and the second platform 22b and they are sent to the merging unit 26 which use cryptographic methods to join the outputs (i.e. results) together, and finally provide the joined output at the system output 28.

The system 20 described above provides an enhanced security as compared to traditional single TEE platform, or multiple homogenous TEE platforms. Therefore, in the system 20 if a new vulnerability is found on Intel SGX, but that vulnerability is not applicable to the ARM TrustZone, the overall system is still secure, and vice versa. To compromise the system 20, an attacker will need either (1) one single vulnerability that can be applied to all platforms 22a, 22b, or (2) at least one unpatched vulnerability on every platforms 22a, 22b at the same time, to successfully launch an attack. Either way, it is going to be much more difficult than just one single TEE vulnerability with no platform restriction. In other words, even if the vulnerability is applicable to more than one platform, developing exploit codes on multiple platforms is going to make the exploitability much less likely to happen. Generally speaking, the chance of having a vulnerability that can be used to attack the system will be decreased by increasing the number of implementations on different TEE platforms.

The system 20 is further adapted to perform key rotation/shuffling after a patch to a discovered vulnerability is applied to the first platform 22a or the second platform 22b. This will render any possible information leaked during that period of exposure window useless.

It should be noted that although the system 20 provides the ability of mitigating TEE vulnerabilities, the application code running on different TEE implementation on the first platform 22a and the second platform 22b should be different too, for example, the choice of cryptographic library, application logic etc., should not be exactly the same.

Figure 2:
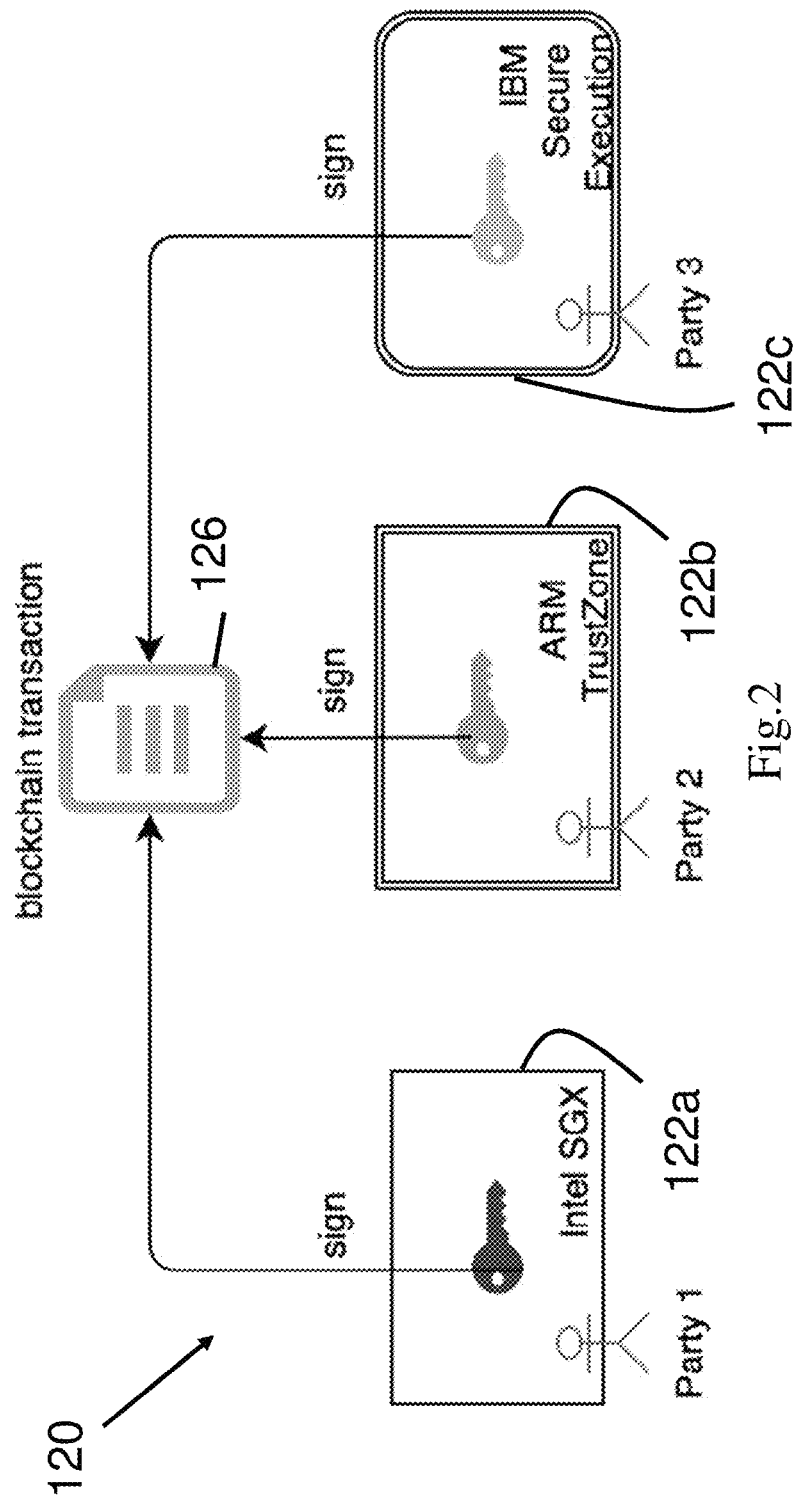
FIG. 2 shows the system of blockchain intrusion prevention according to another embodiment of the invention.

Turning now to FIG. 2, which shows a TEE system 120 that also provides a multiple heterogeneous TEE environment (FIG. 3). There are three TEE platforms in the system 120 with different TEE implementations, namely a first platform 122a that runs Intel SGX, a second platform 122b that runs ARM TrustZone, and a third platform 122c that runs IBM Secure Execution. Each of the platforms 122a, 122b and 122c is owned by different parties (denoted by Party n in FIG. 2), and is configured to generate a different private key. The entire system 120 is configured to generate a final key according to MuSig protocol that is used to sign a blockchain transaction. A blockchain transaction for the address can only be accepted by blockchain nodes when a transaction is signed jointly by three of the parties (using 3 of 3 parties quorum) in accordance with MuSig protocol producing a final valid signature. To achieve this, individual private keys from the platforms 122a, 122b and 122c are merged at a merging unit 126. As described above, an attacker trying to exploit multiple heterogeneous TEE environments must use different mechanisms on each TEE implementation to extract all the private keys. This means that for the system 120, the attacker must be able to extract all private keys from the three heterogeneous TEE platforms 122a, 122b and 122c.

In comparison, for the case of Single-Party Computation (SPC) on homogenous TEE, the security of the TEE is the single point of failure. The system is vulnerable whenever a new TEE vulnerability is found. For the case of Multi-Party Computation (MPC) on homogenous TEE, the security of the system is improved, but the improvement is more on the network side. In comparison to the case of SPC on homogenous TEE, a malicious actor in the MPC on homogenous TEE just needs to be able to access "t" machines instead of just one. However, for the case of MPC on heterogenous TEE like the system 120, the security of the system is further improved, and a malicious actor, even be able to access "t" machines, still would not be able to retrieve the secret unless there are multiple exploitable TEE vulnerabilities on all executing TEE platforms at the same time.

Besides protecting from external hackers, a heterogeneous TEE environment makes TEE related patch management more secure too. For example, the system 120 in FIG. 2 is a 2-of-3 MPC heterogenous TEE implementation allowing redundancy of the private keys for generating the final key. If a TEE vulnerability is found on one of the TEE platforms 122a, 122b and 122c, one can simply disconnect the vulnerable platform and continue to use the rest of the remaining two. And after a patch is available and installed on the vulnerable platform, the whole system 120 can then reshuffle the keys to render the old key, even if it is hacked during the unpatched period, to become useless. The whole system 120 will then be as secure as before the vulnerability is published. On the contrary, on homogenous TEE implementation, the whole system has to be suspended until the vulnerable TEE is patched, which may be in terms of days or even months, and a patch-and-reshuffle process does not provide any extra security measure.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

What is claimed is:

1. A trusted execution environment (TEE) system, comprising:
   a) a first platform that runs a first TEE;
   b) a second platform that runs a second TEE; and
   c) a merging unit that is adapted to merge a first output from the first TEE of the first platform, with a second output from the second TEE of the second platform, so as to form an output of the TEE system;
   wherein the first TEE and the second TEE are based on different implementations; and
   wherein the first output or the second output is reshuffled when a vulnerability of respectively the first TEE and the second TEE is patched.

2. The system of claim 1, wherein application codes running on the first platform and the second platform for the first TEE and the second TEE respectively are different.

3. The system of claim 2, wherein the application codes comprise cryptographic library or application logic.

4. The system of claim 1, wherein the first TEE or the second TEE is adapted to be testified remotely by a user.

5. The system of claim 1, wherein the merging unit is adapted to merge the first output and the second output using a cryptographic method.

6. A method of generating an output of a trusted execution environment (TEE) system, comprising the steps of:
   a) providing a first output from a first TEE of a first platform in the TEE system;
   b) providing a second output from a second TEE of a second platform in the TEE system;
   c) providing a third output from a third TEE of a third platform in the TEE system;
   d) merging the first output, the second output and the third output to form the output of the TEE system;

wherein the method further comprises the steps of:
e) detecting a vulnerability of the first TEE;
f) disconnecting the first TEE; and
g) generating the output of the TEE system by merging the second output and the third output.

7. The method of claim 6, further comprises remotely testifying the first TEE before providing the first output, or remotely testifying the second TEE before providing the second output.

\* \* \* \* \*